Nov. 22, 1955  E. M. BECKER  2,724,463
SAFETY LINE SHOCK ABSORBER
Filed July 2, 1953

INVENTOR.
EARL M. BECKER.
BY Brown, Critchlow, Flick & Peckham
HIS ATTORNEYS.

United States Patent Office 2,724,463
Patented Nov. 22, 1955

2,724,463

SAFETY LINE SHOCK ABSORBER

Earl M. Becker, Pittsburgh, Pa., assignor to Mine Safety Appliances Company, Pittsburgh, Pa., a corporation of Pennsylvania Application July 2, 1953, Serial No. 365,585

5 Claims. (Cl. 188—101)

This invention relates to shock absorbers for safety lines such as are used by window cleaners, steeple jacks and the like, to save them in case they fall.

Even though the fall of a man may be arrested by a safety line anchored above him to a support, the jerk that occurs when the line is pulled taut by the falling man may be so severe as to cause serious injury. Although this particular danger can be avoided by including an elastic member in the safety line to absorb some of the shock, an elastic member, such as a spring or length of rubber, has another disadvantage. That is its resiliency or recoil which will yank the man upward again and perhaps cause him to bounce up and down several times before coming the rest, knocking him against the adjacent structure in the meantime.

It is among the objects of this invention to provide a safety line with a simple and inexpensive shock absorber that has no recoil but which will greatly decrease the shock that otherwise would occur when the safety line is pulled taut by a falling man.

In accordance with this invention a compression disc is disposed in one end of a cylinder, and a second disc is slidably mounted in the cylinder parallel to the first one but normally disposed in the opposite end of the cylinder. A tension member is secured to the second disc and extends lengthwise through the cylinder and slidably through the other disc. The outer end of this member is formed for attachment to a safety line at a point between its ends. Means also is provided for connecting the other disc with the safety line. The cylinder is filled with crushable brittle material that holds the discs apart. If a man loses his footing and falls, the discs will be pulled toward each other by the tension on the safety line, and consequently will crush the material between them. The energy absorbed in crushing the material reduces the shock of the fall by bringing the man to a stop relatively slowly and without bounce.

The preferred embodiment of the invention is illustrated in the accompanying drawing, in which Fig. 1 is a side view of my shock absorber fastened in a safety line;

Figure 1:
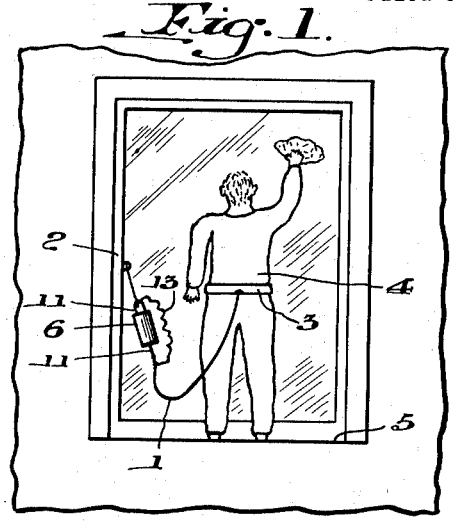

Referring to Fig. 1 of the drawing, a safety line 1 is shown anchored to a support, such as a window frame 2. The other end of the line is attached to the safety belt 3 of a workman 4 standing on the window ledge 5. Between the ends of the line the latter is fastened to the opposite ends of a shock absorber.

Figure 3:
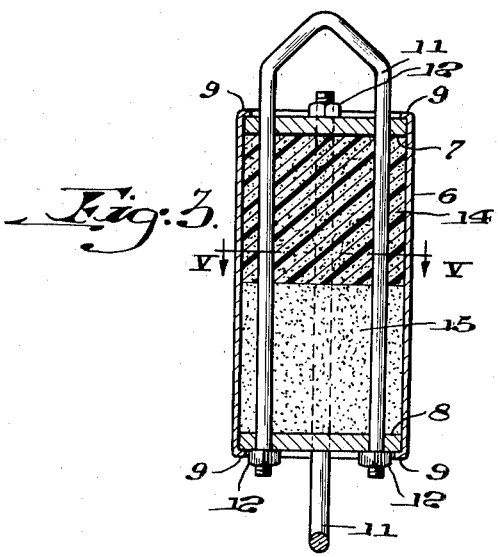
Fig. 3 is an enlarged longitudinal section through the shock absorber before operation.

In accordance with this invention the body of the shock absorber is a cylinder 6 that may be formed from a section of a metal tube. Disposed in opposite ends of the cylinder, as shown in Fig. 3, is a pair of parallel compression discs 7 and 8. They form end walls for the cylinder and are retained in it by any suitable means, such as by inturned flanges 9 which the discs normally engage. At least one of the discs is slidable toward the other one. For simplicity of construction, both ends of the shock absorber may be formed alike, with both discs slidable axially in the cylinder. In such case tension members are fastened to both discs. Each tension member extends lengthwise through the cylinder and slidably through the disc at the opposite end. Preferably, the tension member is a rod 11 that has been bent to form a U-shape stirrup having parallel legs extending through holes in the discs. The ends of the rod are threaded and nuts 12 are screwed on them to hold the rod in place. The bent portion of the rod that projects from the other disc is secured to the safety line 1. This can be done by first cutting the line and then tying the severed ends to the two stirrups. It is not necessary nor preferred to cut the line, however, for it is safer to tie the two stirrups to it at spaced points with a large loop 13 left in the line between the points of attachment. One of the stirrups lies in a plane at right angles to the plane of the other stirrup.

The cylinder between the compression disc is filled with a suitable crushable brittle material, by which is meant a material that is hard and strong enough to offer considerable resistance to the movement of either disc toward the other, but which will break or collapse and be crushed by them when enough force is applied to the discs, without attempting to return to its original form. The material must crush under the weight of a falling man, but it must not crush so easily that it will not gradually decelerate his fall. For this purpose an expanded brittle material can be used; cellular cellulose acetate or an expanded thermoplastic vinyl resin being very suitable. Foam glass or a crushable granular material likewise can be employed. As will be shown, it may be preferred to use a combination of two or more such materials having different resistances to crushing. For example, two crushable materials 14 and 15 can be used, one above the other. One of these will crush when subjected to a predetermined force, and the other when subjected to a greater predetermined force.

Figure 2:
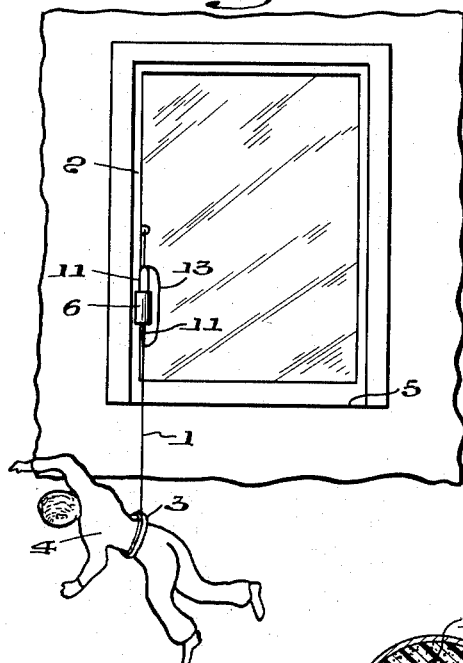
Fig. 2 is a similar view showing the shock absorber after it has operated in an emergency.
Figure 4:
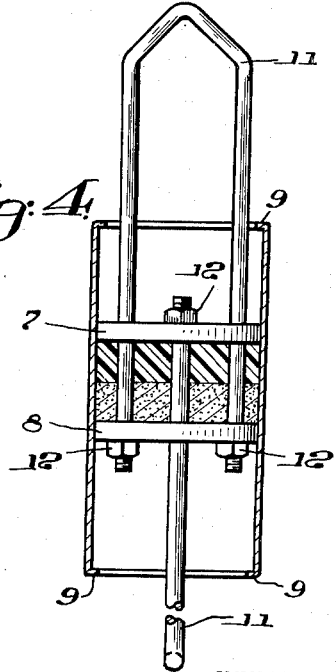
Fig. 4 is a similar section after operation.
Figure 5:
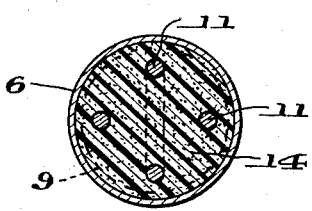
Fig. 5 is a cross section taken on the line V—V of Fig. 3.

It will be seen that if the man loses his footing on the window ledge and falls from it, as shown in Fig. 2, as soon as the portions of the safety line above and below the shock absorber are pulled taut the lower disc 8 or cylinder end wall will remain substantially stationary but the upper disc 7 will be pulled down toward it by the weight of the man. This will break down or crush the material in the cylinder between the discs, and the considerable energy required for that purpose is absorbed by the crushed material so that the fall of the man is arrested much more slowly than if the shock absorber were not present. When his fall finally is stopped by the safety line, he will remain suspended in that position and not be jerked upward again, because the crushed material will not attempt to expand like resilient material would.

The advantage of using the two different materials 14 and 15 is that if the safety line allows the man to fall only a short distance, or if he does not weigh much, the weaker material will be crushed nevertheless and will decelerate his body gradually. On the other hand, if he has a longer fall or is a heavy man, the stronger material also will be crushed to absorb still more energy. If all of the material were the same in both cases, the effect might be that the material would not crush in one instance or would crush too readily in the other.

According to the provisions of the patent statutes, I have explained the principle of my invention and have illustrated and described what I now consider to represent

I claim:

1. A safety line shock absorber comprising a cylinder, a compression disc disposed in one end of the cylinder, a second compression disc slidably mounted in the cylinder parallel to the other disc but normally disposed in the opposite end of the cylinder, a tension member secured to the second disc and extending lengthwise through the cylinder and slidably through the other disc, the other disc and the outer end of said member being adapted to be attached to a safety line at spaced points between its ends, and crushable brittle material filling the cylinder and holding the discs apart, whereby if the second disc is pulled toward the other disc by sudden tension on the safety line said material will be crushed and the shock thereby reduced.

2. A safety line shock absorber comprising a cylinder, a compression disc disposed in one end of the cylinder, a second compression disc slidably mounted in the cylinder parallel to the other disc but normally disposed in the opposite end of the cylinder, a tension member secured to each disc and extending lengthwise through the cylinder and slidably through the other disc, the outer ends of said members being adapted to be attached to a safety line at spaced points between its ends, and crushable brittle material filling the cylinder and holds the discs apart, whereby if the second disc is pulled toward the other disc by sudden tension on the safety line said material will be crushed and the shock thereby reduced.

3. A safety line shock absorber comprising a cylinder, a pair of parallel compression discs slidably mounted therein but normally disposed at opposite ends of the cylinder to form end walls for it, a tension member secured to each disc and extending lengthwise through the cylinder and slidably through the other disc, the outer ends of said members being adapted to be attached to a safety line at spaced points between its ends, and crushable brittle material filling the cylinder and holding the discs apart, whereby if the discs are pulled toward each other by sudden tension on the safety line said material will be crushed and the shock thereby reduced.

4. A safety line shock absorber comprising a cylinder, a pair of parallel compression discs slidably mounted therein but normally disposed at opposite ends of the cylinder to form end walls for it, the opposite ends of the cylinder having internal flanges holding the discs in the cylinder, a U-shape rod having its opposite ends secured to each disc and having parallel legs extending lengthwise through the cylinder and slidably through the other disc, the projecting portions of said rods being adapted to be attached to a safety line at spaced points between its ends, and crushable brittle material filling the cylinder and holding the discs apart, whereby if the discs are pulled toward each other by sudden tension on the safety line said material will be crushed and the shock thereby reduced.

5. A shock absorber in accordance with claim 1, in which said material is formed from materials having different resistances to crushing.

References Cited in the file of this patent

UNITED STATES PATENTS

| | | |
|---|---|---|
| 1,145,923 | Rolston | July 13, 1915 |
| 1,260,921 | Leissner | Mar. 26, 1918 |
| 1,269,606 | Hovas | June 18, 1918 |
| 1,641,268 | Halliburton | Sept. 6, 1927 |
| 1,994,322 | O'Neil | Mar. 12, 1935 |